Patented Jan. 9, 1951

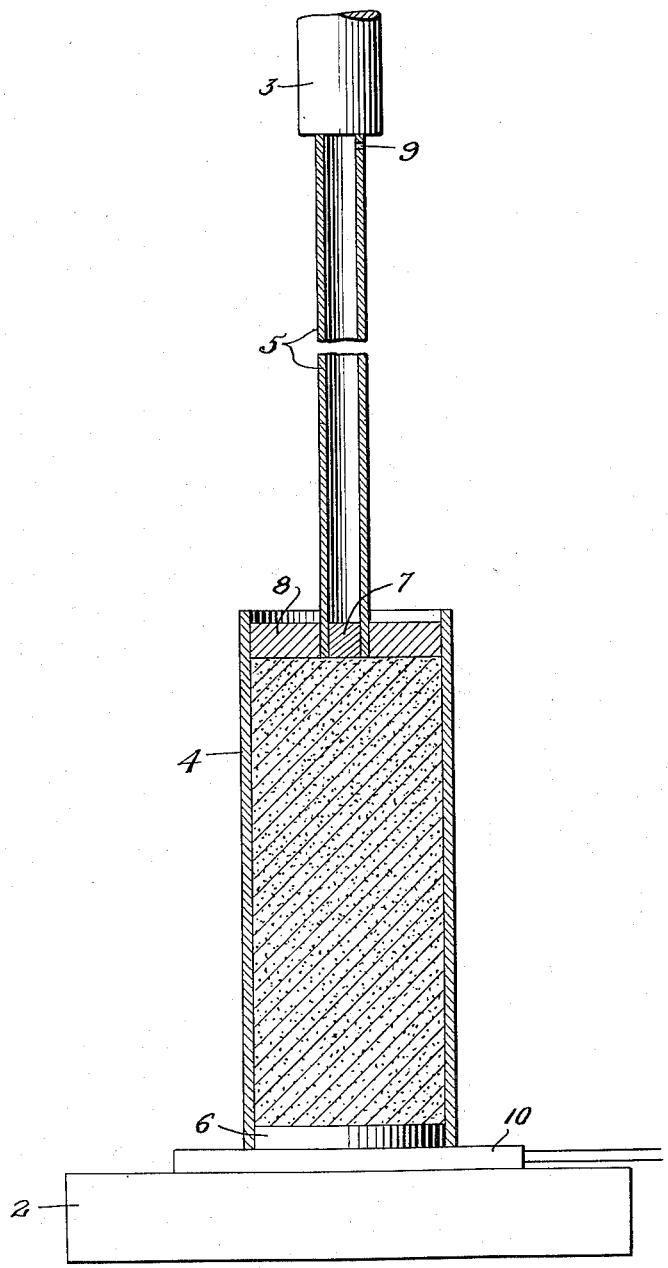

2,537,285

UNITED STATES PATENT OFFICE 2,537,285

MOLDING EQUIPMENT

Louis L. Stott, Reading, Pa., assignor to The Polymer Corporation, Reading, Pa., a corporation of Pennsylvania Application October 24, 1945, Serial No. 624,241

6 Claims. (Cl. 18—12)

This invention relates to the molding of elongated shapes from plastic materials. The invention is particularly concerned with the molding of bars or rods of relatively small diameter, for instance, less than 3/4" or 1" in diameter. The invention is also of especial advantage where the rods to be molded are of considerable length, for instance, 3 or more feet.

Although the invention is applicable to the molding of elongated shapes from plastic materials of a variety of types, the invention is of especial utility in the molding of certain plastics which have heretofore been difficult to handle by various forming processes, such as compression molding, extrusion, etc. Notable among these plastics which have heretofore been difficult to compression mold or extrude in the formation of elongated shapes of small cross sections are the high melting point synthetic linear polyamides, such as formed by reacting a diamine with a dibasic acid, for instance the polyamide formed as the reaction product of hexamethylene diamine and adipic acid. A polyamide of this type is known to the trade as "Nylon." This particular polyamide has high volumetric shrinkage upon solidification, as well as relatively high fluidity in the molten condition, and these characteristics, in addition to an unusually sharp melting point for a synthetic plastic, present special problems in connection with normal molding or extrusion techniques. The invention is of especial utility as applied to the high melting point linear polyamides of this type.

As disclosed in my prior copending application Serial No. 595,325 filed May 23, 1945, axially applied molding pressure is of advantage in molding elongated shapes from polyamides of the character mentioned. Moreover, said copending application also discloses the employment of progressive cooling of the piece being molded. (Said Application 595,325 was abandoned upon the filing of a continuation-in-part application Serial No. 766,021, which issued on May 2, 1950, as Patent No. 2,505,807.) These features are also employed in accordance with the practice herein employed, and it is here noted that the present invention contemplates certain improvements over the equipment and method disclosed in my prior application, which improvements are of especial importance in the molding of elongated shapes of small diameter, especially rods of 1/2" diameter or smaller.

One of the objects of the present invention is to eliminate the necessity for initially packing or charging a small diameter tubular molding member with the plastic material preparatory to molding the piece.

Another object of the invention is the arrangement of molding equipment which is more effective in applying the desired high pressure axially of the piece being molded. By virtue of the arrangement of the molding equipment, it is even practicable to mold elongated pieces of angular cross section under high pressure applied lengthwise of the piece being formed.

How the foregoing and other objects and advantages are attained can be understood to best advantage after more specific consideration of the equipment and method contemplated according to the present invention. The following description of the equipment and method refers to the accompanying drawing, the single figure of which is a vertical sectional view of molding equipment arranged according to the present invention, with certain parts shown in elevation.

Referring to the drawing, the reference numeral 2 designates a base or bed of a mold press, the numeral 3 indicating a plunger adapted to be moved downwardly by the head of the press, for example under hydraulic pressure.

The equipment, generally speaking, comprises external and internal telescopic members 4 and 5 adapted to be positioned between the bed 2 and the plunger 3 so as to be telescoped under the hydraulic pressure of the press. These telescopic members are advantageously formed of metal.

The external member 4 is closed at its lower end by means of a removable plug 6 preferably formed of a material having a coefficient of thermal expansion greater than that of the tube 4, so as to insure a tight fit when the member 4 is heated and pressure is being applied, as disclosed in my copending application above identified. The external member 4 is adapted to receive a charge of the plastic material to be molded.

The internal member 5 has an interior shape conforming substantially to that of the elongated shape to be molded. A plug 7 is snugly fitted in the mold tube 5, but the plug is capable of sliding movement in the tube when pressure is applied, as described herebelow. An annular sealing member 8 fills the gap between the external surface of the tube 5 and the internal surface of the tube 4. This sealing member is advantageously permanently secured to the internal member 5, so that upon application of pressure from the plunger 3 to the upper end of the tube 5, the pressure is transmitted to the entire top surface of the plastic material charged into the external tube 4.

The upper end of the mold tube 5 is preferably vented as indicated at 9, for a purpose later to be described. It is also noted that an electric heater plate or other heating means such as shown at 10 may be positioned below the bottom end of the external tube 4, also for a purpose to be discussed below.

In considering the operation of the equipment above described, it is assumed that an elongated rod of about ½" diameter and 36" length is to be molded from the polyamide formed as the reaction product of hexamethylene-diamine and adipic acid. The plug 6 is first inserted in the lower end of tube 4 and the tube 4 is then charged with a suitable amount of the plastic material in flake, chunk or granular form. Advantageously, this material is preliminarily cold pressed in the tube 4 to ensure compact charging. The lower end of the internal mold tube 5 with the apertured plug 8 secured thereto is then inserted in the upper end of the tube 4, the plug 7 being positioned in the lower end of the tube 5 as illustrated in the drawing.

The tube 4 and the charge of plastic material therein is next heated to an appropriate temperature to render the plastic material molten, advantageously this is accomplished in the general manner described in my copending application above referred to, i. e. by immersing the tube 4 in a heating bath, the mold tube 5 and the plugs 7 and 8 being retained in assembled relation as described above. The mold tube 5 need not be immersed in the heating bath.

The temperature to which the plastic material is raised will depend not only on the particular plastic being used, but also on the length and other dimensions of the piece to be molded. The The particular polyamide here under consideration has a melting point in the neighborhood of 505° F. and I have found an appropriate temperature to start molding to be in the neighborhood of 540° F. In a typical case, for the molding of a rod of ½" diameter, with an external tube 4 of 1⅛" inside diameter, an appropriate temperature may be attained by immersing the tube 4 for twenty minutes in a heating bath maintained at a temperature of about 560° F.

After proper heating to render the plastic molten, the assembly of internal and external telescopic members is transferred to the press in the position illustrated in the drawing, and the press is then actuated to apply pressure through the plunger 3 to the upper end of the mold tube 5. This pressure is delivered through the tube 5 and the annular plug 8 to the molten plastic material in the tube 4, which forces the plastic material upwardly against the plug 7 within the tube 5. The pressure applied causes the plug 7 to slide upwardly in the mold tube, air in the tube being vented at the upper end thereof, as for instance through the vent 9 indicated in the drawing.

The employment of the snugly fitting plug 7 in the mold tube 5 is of advantage in preventing access of air to the plastic material during the molding operation. The plug, in effect, constituttes a piston or plunger which drives the air out of the mold tube just ahead of the incoming column of molten plastic matrial. When the plug reaches the upper end of the tubular mold, it abuts against the plunger of the press and the molding pressure applied to the plastic in the mold cavity reacts through the plug against the press plunger.

By employing the equipment and method above described, the necessity for packing or charging a mold tube of small diameter with plastic material, for instance in flake form, is eliminated. As above mentioned, it is of advantage that the plug 7 be formed of a material having a coefficient of thermal expansion higher than that of the mold tube, since, in this way, tightness of fit is assured. Because of the necessity for a tight fit of this plug and further because of the requirement that the plug slide within the tube, the material of which the plug is formed should be carefully selected so as not to score the interior of the mold tube. For this purpose, certain of the metals and alloys may be employed, such, for example, as copper, aluminum and magnesium alloys, although I have found a particularly desirable material to be synthetic plastics having melting points higher than the plastic being molded. I have secured especially effective results by the employment of a plug made of polytetrafluoroethylene.

In accordance with the equipment and procedure above described, I have found that a sound rod of ½" diameter 36" long may be molded using pressures on the molten plastic of around 8,000 lbs. per sq. in.

It may be mentioned that, for certain purposes, the external diameter of the mold tube 5 may be made so as to tightly fit within the external tube 4, thus eliminating the necessity for employment of an annular plug such as indicated at 8. I prefer, however, to employ an external or "heating" tube 4 of larger diameter than the external diameter of the mold tube 5, this being of advantage for a number of reasons, including the fact that the differential between the cross-sectional areas of the mold tube and the external tube results in filling the mold tube with a column of the molden plastic with a smaller overall length of stroke of the press. A further advantage follows from the fact that employment of a relatively large diameter external tube 4 facilitates initial packing or charging of the plastic material in the tube.

Beyond the foregoing, it is contemplated that the volume of the external tube 4 be such as to provide for packing the tube with a somewhat greater volume of plastic than that required for molding the rod or other piece. As a result, upon completion of the molding of a piece, there still remains a small amount of molten material within the external tube 4 and this acts as a feeding head, similar to the "riser" in metal casting, which assists in attaining a dense structure in the piece being molded.

The volumetric excess of the plastic material in the external tube is of still further advantage in promoting progressive or directional cooling and solidification of the plastic in the tube 5 from the upper end thereof downwardly to the lower end thereof. This progressive cooling and solidification is also promoted by virtue of the exposure of the upper end of the mold tube 5 and by virtue of its thermal contact with the cooler press plunger 3 at the upper end and with the hotter body of plastic at the lower end. It is also contemplated that the lower end of the external tube 4 and the plastic material therein be supplied with heat during the molding operation, as by an electric heating unit 10 or other heating means interposed between the bed 2 of the press and the plug 6 in the lower end of the tube 4. All of these factors promote the desirable progressive cooling of the piece being molded from one end thereof to the other, this being of advantage for reasons fully brought out in my copending application above identified.

Still another advantage of the arrangement and method described above is that it becomes practicable to increase the molding pressure as compared with that which may be applied by a pressure plunger directly entering the cavity of the tubular mold itself. The reason for this is that, when molding elongated shapes of small cross section, a pressure plunger entering the mold cavity itself is necessarily also of small cross section, thus being readily susceptible to transverse flexure, which limits the pressure which may be applied thereto to a value insufficient to secure soundness of internal structure in the piece being molded.

Another distinctive advantage of the equipment and method of this invention is that the molding of elongated pieces of angular cross section is greatly facilitated. To illustrate, it is contemplated that the tubular mold may have a cavity of square cross section. As is well known, it is extremely difficult to provide a seal for a pressure plunger of angular cross section working in a similarly shaped cavity. According to my invention, the necessity for employing such an angular pressure seal is eliminated, the only movable or sliding pressure seal required being of cylindrical shape, i. e. between the outer surface of the seal member 8 and the inner cylindrical wall of the container 4.

It will be understood that if desired, for instance in the molding of certain plastics having relatively small volumetric shrinkage upon solidification, the tubular mold may be of longitudinally split construction, the mold parts, for example, being held together by surrounding rings, or other mechanical means.

I claim:

1. Equipment for molding elongated shapes from molten plastic material, comprising telescopic internal and external tubular members, the external member comprising a container having a cylindrical cavity adapted to receive a charge of molten plastic material and being closed at one end, and the internal member comprising a mold tube having its telescoping end open to receive plastic material forced under pressure from the container, and the interior of the mold tube being configured according to the contour of the elongated shape to be molded, a plug snugly fitting but slidable in the interior of the mold tube, the plug being adapted to be positioned adjacent the open end of the mold tube preparatory to effecting a molding operation and being adapted to be driven to the other end of the mold tube upon entrance of material to be molded, abutment means at the other end of the mold tube adapted to engage the plug, and the plug further providing a pressure tight seal at the end of the mold tube serving as a reaction point for the molding pressure applied to the material in the container, and said tubular members being arranged for relative telescopic movement under pressure and having an annular pressure seal therebetween effective to retain the material under pressure during cooling.

2. Equipment according to claim 1 in which said plug has a higher coefficient of thermal expansion than the coefficient of the internal tubular member.

3. Equipment according to claim 1 in which the diameter of the cylindrical cavity in the external tubular member is substantially greater than the external dimension of the internal member, to provide an interspace between said members, which interspace, however, is sealed by said annular pressure seal.

4. Equipment according to claim 1 in which the outer end of the internal tubular member is vented.

5. Equipment according to claim 1 in which said plug is formed of polytetrafluoroethylene.

6. Equipment for molding plastic materials to elongated shapes of angular cross section, including a tubular mold adapted to receive molten plastic material introduced into an end thereof and having an interior cavity conforming to the elongated and angularly cross sectioned shape desired, a container having a cylindrical cavity adapted to receive a charge of molten plastic material, the cross sectional area of the container cavity being greater than that of the entrance end of the mold cavity, the tubular mold and the container being adapted to be positioned in end to end relation and to be telescoped with respect to each other, sealing means intervening between the tubular mold and the wall of the cavity in the container and having an externally presented cylindrical sealing surface adapted to engage and slide in the cylindrical cavity of the container and thereby provide for application of pressure to the molten plastic in the container cavity to cause said plastics to flow from the container cavity into the tubular mold through the entrance end of the latter when the mold and the container are telescoped, the mold cavity of the tubular mold being of uniform cross section throughout its length, a plug fitted in the mold cavity and slidable therein, the plug being adapted to be initially placed in the entrance end of the mold cavity and to be moved toward the other end thereof under the influence of the pressure of the plastic entering the mold cavity when the mold and the container are telescoped, and abutment means fixed at the outer end of the internal member adapted to engage the plug and serving as a pressure reaction point for placing the material to be molded under axial pressure in the tubular mold.

LOUIS L. STOTT.

REFERENCES CITED

The following references are of record in the file of this patent:

UNITED STATES PATENTS

| Number | Name | Date |
|---|---|---|
| 461,721 | Thurfelder | Oct. 20, 1891 |
| 2,090,489 | Sommerfeld | Aug. 17, 1937 |

Certificate of Correction

Patent No. 2,537,285 January 9, 1951

LOUIS L. STOTT

It is hereby certified that error appears in the printed specification of the above numbered patent requiring correction as follows:

Column 6, list of references cited, under "UNITED STATES PATENTS" add the following—

| | | |
|---|---|---|
| 1,598,201 | Koppitz | Aug. 31, 1926 |
| 2,136,425 | Fields | Nov. 15, 1938 |

FOREIGN PATENTS

| Number | Country | Date |
|---|---|---|
| 388,662 | Great Britain | Mar. 2, 1933 | and that the said Letters Patent should be read as corrected above, so that the same may conform to the record of the case in the Patent Office.

Signed and sealed this 27th day of February, A. D. 1951.

[SEAL]

THOMAS F. MURPHY,
*Assistant Commissioner of Patents.*